United States Patent
Du et al.

(10) Patent No.: US 8,248,494 B2
(45) Date of Patent: Aug. 21, 2012

(54) IMAGE DYNAMIC RANGE COMPRESSION METHOD, APPARATUS, AND DIGITAL CAMERA

(75) Inventors: Cheng Du, Beijing (CN); Tong Liu, Beijing (CN); Gang Wang, Beijing (CN); Zhongchao Shi, Beijing (CN); Tao Li, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 515 days.

(21) Appl. No.: 12/453,501

(22) Filed: May 13, 2009

(65) Prior Publication Data

US 2009/0290040 A1  Nov. 26, 2009

(30) Foreign Application Priority Data

May 20, 2008  (CN) .......................... 2008 1 0100720

(51) Int. Cl.
  *H04N 5/202* (2006.01)
  *G06K 9/40* (2006.01)
(52) U.S. Cl. ........................................ 348/254; 382/274
(58) Field of Classification Search .................. 348/254, 348/255, 256, 362; 382/274
  See application file for complete search history.

(56) References Cited

U.S. PATENT DOCUMENTS

| | | | |
|---|---|---|---|
| 6,069,979 A * | 5/2000 | VanMetter | 382/260 |
| 7,464,875 B2 * | 12/2008 | Pan et al. | 235/454 |
| 7,639,893 B2 * | 12/2009 | Duan et al. | 382/274 |
| 7,791,656 B2 * | 9/2010 | Katagiri et al. | 348/254 |
| 2004/0179132 A1 * | 9/2004 | Fujino et al. | 348/363 |
| 2008/0259181 A1 * | 10/2008 | Yamashita et al. | 348/229.1 |
| 2009/0161953 A1 * | 6/2009 | Ciurea et al. | 382/172 |
| 2010/0309346 A1 * | 12/2010 | Brunner et al. | 348/254 |

FOREIGN PATENT DOCUMENTS

JP  2009296488 A  * 12/2009

* cited by examiner

*Primary Examiner* — Timothy J Henn
(74) *Attorney, Agent, or Firm* — Harness, Dickey & Pierce, P.L.C.

(57) ABSTRACT

A method of compressing an original dynamic range of an original image, includes a first step of obtaining a reduced image corresponding to the original image by performing quantization and downsampling on the original image that has been input; a second step of calculating a look-up table based on the reduced image, wherein the look-up table indicates a mapping relationship between the original dynamic range of the original image and a dynamic range of a medium; and a third step of mapping each of the pixels in the original image from the original dynamic range of the original image onto the dynamic range of the medium based on the look-up table.

13 Claims, 7 Drawing Sheets

IMAGE DYNAMIC RANGE COMPRESSION METHOD, APPARATUS, AND DIGITAL CAMERA

BACKGROUND OF THE INVENTION

1. Field of the Invention

The present invention relates to the field of image processing and the field of digital camera application, and more particularly to an original image dynamic range compression method, an apparatus, and a digital camera, in which the dynamic range of an input image is mapped onto the dynamic range of a reproduction medium to reproduce the image in the medium.

2. Description of the Related Art

In the field of image processing and the field of digital camera application, dynamic range is also referred to as a brightness range, which is expressed by the ratio of the highest brightness and the lowest brightness in a scene or an image. For example, the dynamic range of an image pickup device such as a digital camera or a display device such as a personal computer display, is far smaller than that of the natural scene. Therefore, in order to display everything in the scene, it is necessary to apply dynamic compression or a conversion technique referred to as tone mapping.

In the field of cameras, methods for implementing tone mapping have already been developed. These methods can be classified into total range methods and local methods. The total range method is performed by separately processing each pixel in an image. The total range method takes into consideration the overall characteristics of an image. The total range method is typically performed by calculating a monotone mapping curve, and mapping each pixel of the input image onto the output image based on the calculated curve. The local method is typically performed by imitating the characteristics of a visual system of a human being. For example, it is rationally hypothesized that a human being's eyesight is adjusted based on the local characteristics of a target point, instead of on the overall image. For each pixel in an input image, the value in the output image is determined based on local image characteristics near the corresponding pixel. The calculating speed of the total range method is higher than that of the local method, and real-time calculation can be achieved with the use of a computer. However, with the total range method, detailed portions may be lost from a scene having a considerably large input dynamic range. The local method is more advantageous in terms of mapping detailed portions of a scene, but the calculating speed is lower than the total range method, and a defective image may be formed (for example, a blurred image).

In the tone mapping of the related art, different parameters are used for different regions of interest (ROI). There is an eyeball tracing method and a scan route tracing method for finding the region corresponding to the user's region of interest. The eyeball tracing method is performed by tracing the movement of the eyeball of the photographer. However, when different tone mapping parameters are used for different regions, discontinuous luminance change may occur at the boundaries between the regions. Furthermore, it is not easy to detect the region of interest. If there is an error in finding the region, the entire image may not be successfully converted. Furthermore, additional devices are required for performing the eyeball tracing method, which increases the cost of the digital camera.

There is proposed another tone mapping method in the related art. Specifically, a small difference between contrast ratios of different regions in an image is retained, but a large difference between contrast ratios of different regions in the image is compressed. For example, a hard threshold of 4:1 is specified for the local contrast ratio. When the local contrast ratio exceeds this hard threshold, the corresponding local contrast ratio is reduced (compressed) to 4:1. However, when an image has significantly large local contrast ratios, the image quality may be degraded by performing this compression method with the use of a hard threshold. Furthermore, it is time-consuming to calculate local contrast ratios. Accordingly, application of this method has limitations.

There is a large difference between the dynamic range in an image pickup device or a display device, and the dynamic range of a natural scene. Therefore, when a natural scene is reproduced in a digital camera or a computer display, it is necessary to compress the dynamic range of the natural scene by the tone mapping technology. Furthermore, with the advancement in the digital camera technology, image resolution is becoming increasingly high. In conceiving the present invention, the following findings were obtained. That is, currently available digital cameras can take an image of 10 million pixels, but the processing capacities of the CPU and the memory of a digital camera are lower than that of a computer. Accordingly, when applying the dynamic range compression technology to a digital camera, it is necessary to increase the speed of the tone mapping process, and to solve the problem of the low processing capacity of the digital camera in processing large (high-resolution) images.

SUMMARY OF THE INVENTION

The present invention provides an image dynamic range compression method, an apparatus, and a digital camera, in which one or more of the above-described disadvantages are eliminated.

A preferred embodiment of the present invention provides an image dynamic range compression method, an apparatus, and a digital camera, in which large (high-resolution) images can be processed with low processing capacity.

According to an aspect of the present invention, there is provided a method of compressing an original dynamic range of an original image, including a first step of obtaining a reduced image corresponding to the original image by performing quantization and downsampling on the original image that has been input; a second step of calculating a look-up table based on the reduced image, wherein the look-up table indicates a mapping relationship between the original dynamic range of the original image and a dynamic range of a medium; and a third step of mapping each of the pixels in the original image from the original dynamic range of the original image onto the dynamic range of the medium based on the look-up table.

According to an aspect of the present invention, there is provided an apparatus for compressing an original dynamic range of an original image, including a reduced image calculation module configured to obtain a reduced image corresponding to the original image by performing quantization and downsampling on the original image that has been input; a look-up table calculation module configured to calculate a look-up table based on the reduced image, wherein the look-up table indicates a mapping relationship between the original dynamic range of the original image and a dynamic range of a medium; and a mapping module configured to map each of the pixels in the original image from the original dynamic range of the original image onto the dynamic range of the medium based on the look-up table.

According to an aspect of the present invention, there is provided a digital camera for compressing an original dynamic range of an original image, including a CPU, a ROM, and a RAM, where a function unit of the ROM includes a reduced image calculation module configured to obtain a reduced image corresponding to the original image by performing quantization and downsampling on the original image that has been input; a look-up table calculation module configured to calculate a look-up table based on the reduced image, wherein the look-up table indicates a mapping relationship between the original dynamic range of the original image and a dynamic range of a medium; and a mapping module configured to map the original dynamic range of the original image onto the dynamic range of the medium by performing, based on the look-up table, a search operation and interpolation on each of the pixels in the original image.

According to one embodiment of the present invention, an image dynamic range compression method, an apparatus, and a digital camera, are provided, in which large (high-resolution) images can be processed with low processing capacity.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

Figure 1:
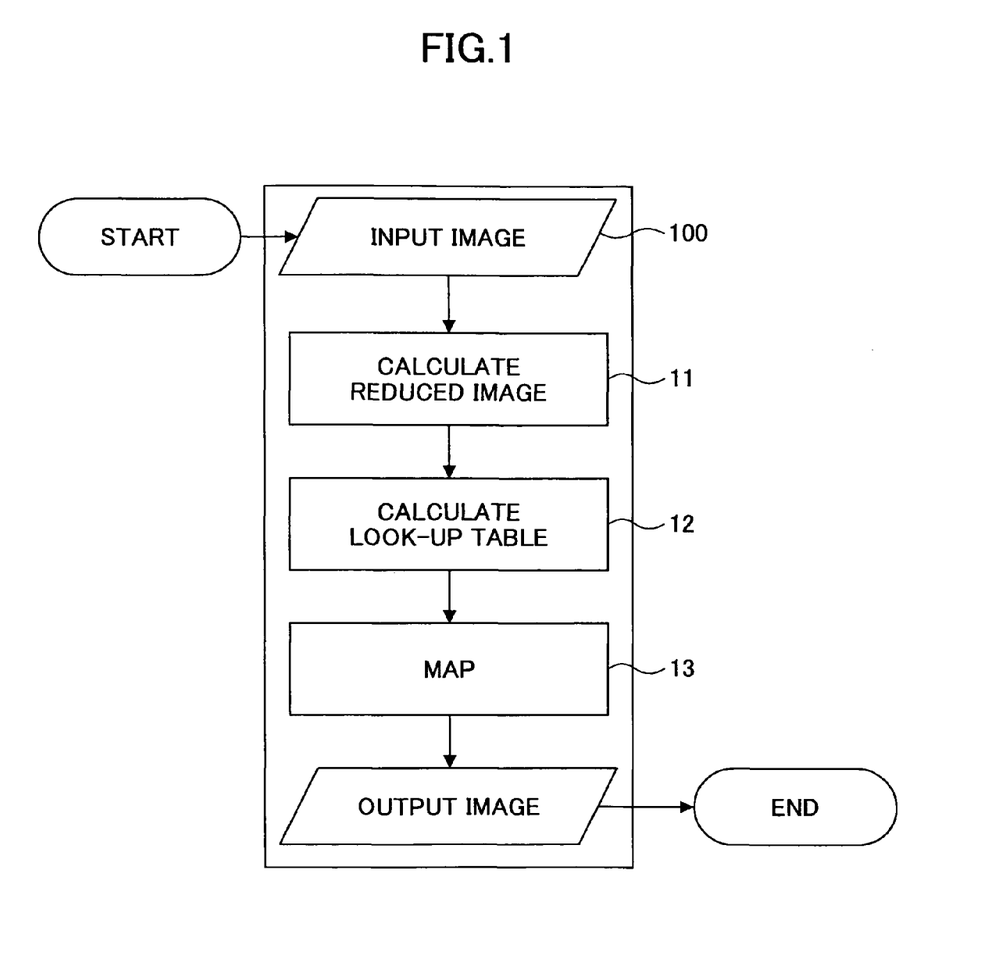
FIG. 1 is a flowchart of a tone mapping method according to an embodiment of the present invention.

FIG. 1 is a structural flowchart of a tone mapping processor 100.

The tone mapping processor 100 is an apparatus according to an embodiment of the present invention, for performing a dynamic range compression method on an image. The tone mapping processor 100 includes a reduced image calculation module 11, a look-up table (LUT) calculation module 12, and a mapping module 13. The tone mapping process is performed as follows. First, an image (original image) is input to the tone mapping processor 100. Then, the reduced image calculation module 11 calculates a reduced image corresponding to the input image. Subsequently, the look-up table calculation module 12 calculates a look-up table for mapping based on characteristics of the reduced image. The look-up table indicates the mapping relationship between the original dynamic range (high dynamic range) and the dynamic range of the medium. Finally, the mapping module 13 calculates the mapping value of each point in the input image based on the look-up table, and applies the dynamic range of the converted image to the dynamic range of the medium for reproducing the image. The look-up table is calculated based on the reduced image instead of on the original image, in order to increase the speed of the tone mapping process.

Figure 2:
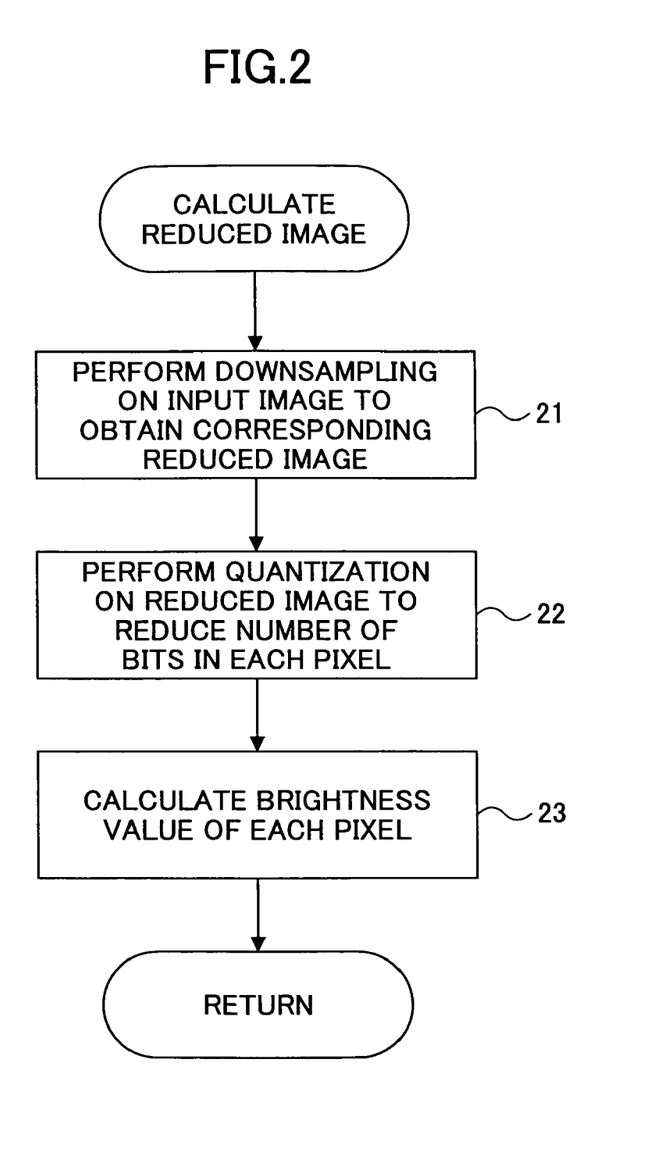
FIG. 2 is a structural flowchart of a reduced image calculation module according to an embodiment of the present invention.

FIG. 2 is a structural flowchart of the reduced image calculation module 11. The reduced image calculation module 11 includes a downsampling module 21, a quantization module 22, and a brightness calculation module 23. The size (resolution) of the image is reduced by the downsampling module 21, for example from 3468×2776 to 320×240. Then, the quantization module 22 quantizes each pixel in the reduced image, by reducing the number of bits per channel in each pixel, for example from 18 bits/channel to 8 bits/channel. Finally, the brightness calculation module 23 calculates a brightness value corresponding to each pixel in the reduced image, by the following formula.

$$L(x, y) = \frac{R(x, y) + Gr(x, y) + Gb(x, y) + B(x, y)}{4} \qquad \text{formula 1}$$

Figure 3:
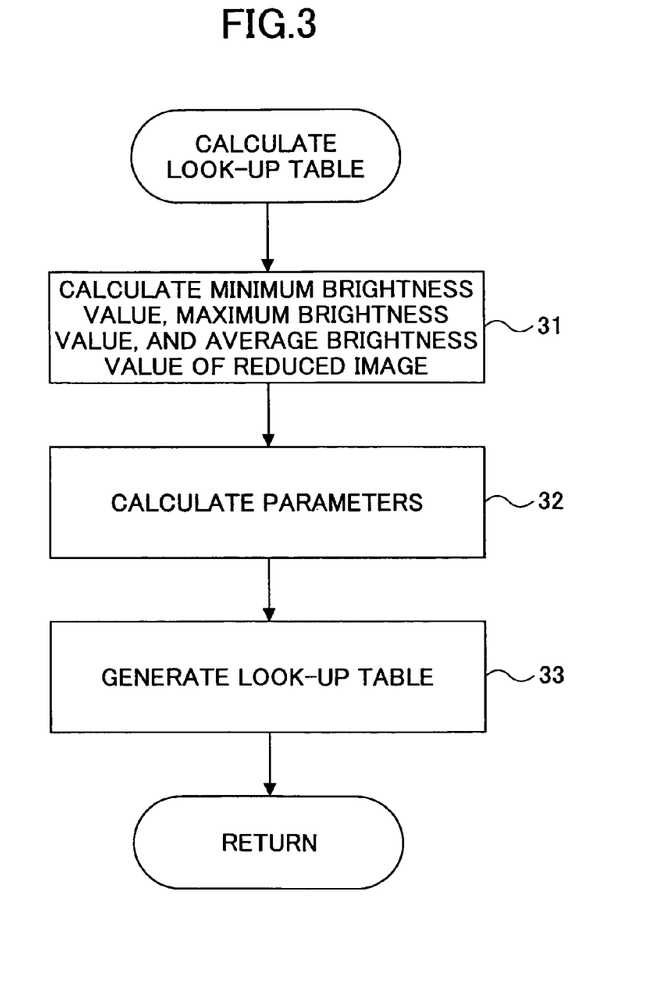
FIG. 3 is a structural flowchart of a look-up table calculation module according to an embodiment of the present invention.

FIG. 3 is a structural flowchart of the look-up table calculation module 12. The look-up table calculation module 12 includes a statistical feature calculation module 31, a parameter calculation module 32, and a look-up table generation module 33. The statistical feature calculation module 31 calculates the minimum value (Min_Y) of brightness in the reduced image, the maximum value (Max_Y) of brightness in the reduced image, and the average value (Average_Y) of brightness in the reduced image. Then, the parameter calculation module 32 uses the following formulas (2), (3), and (4) to calculate a set of parameters. Finally, the look-up table generation module 33 generates a look-up table used for mapping with the set of parameters.

$$LowR = \frac{Min\_Y}{10} \times \frac{Medium\_Range}{100} \qquad \text{formula 2}$$

$$HighR = \left(255 - \frac{(255 - Max\_Y)}{10}\right) \times \frac{Medium\_Range}{100} \qquad \text{formula 3}$$

$$Factor = Average\_Y \times \frac{10}{10 + f} + 30 \qquad \text{formula 4}$$

The Medium_Range is applied to the dynamic range of the medium for reproducing the image. In the present embodiment, the input image of 18 bits/channel is mapped onto an image of 12 bits/channel, and therefore the Medium_Range is 4,096. The parameters 10 and 100 in formulas (2) and (3) are set based on experience, and can be changed in other embodiments. In the present embodiment, when the reduced image (8 bits/channel) corresponding to the input image has a minimum brightness value of 10, the value of LowR is 4096/100=40. The parameter f in formula (4) can be adjusted by the user, which is used for adjusting the overall brightness of the output image. The higher the parameter f becomes, the brighter the output image. In the present embodiment, the f value is between −10 and 10. The parameters 10 and 30 in formula (4) are set based on experience, and can be changed in other embodiments.

Figure 4:
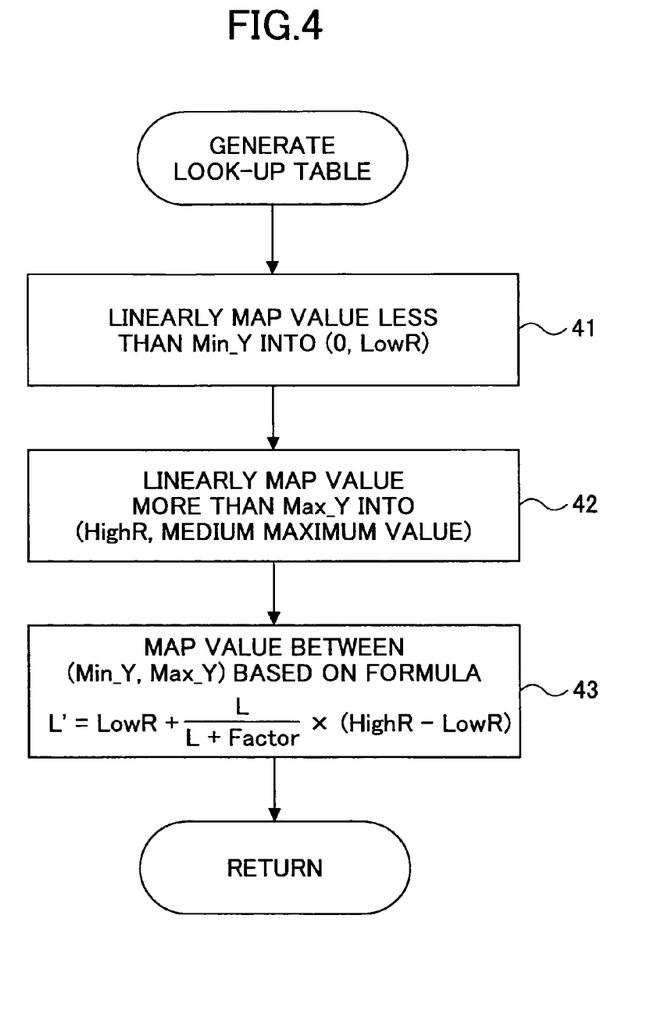
FIG. 4 is a structural flowchart of a look-up table generation module according to an embodiment of the present invention.

FIG. 4 is a structural flowchart of the look-up table generation module 33. The dynamic range (in the present embodiment, 8 bits/channel, 0 to 255) of the reduced image is divided into three ranges. In an embodiment of the present invention, look-up tables are generated by different methods for different ranges. A module 41 generates a look-up table in which values in a range of (0, Min_Y) are linearly mapped to a range of (0, LowR). A module 42 generates a look-up table in which values in a range of (Max_Y, 255) (where 255 is a maximum logical value of the original image) are linearly mapped to a range of (HighR, 4096) (where 4096 is a medium maximum value in the dynamic range of the medium). A module 43 generates a look-up table in which values in a range of (Min_Y, Max_Y) are mapped to a range of (LowR, HighR) by the following formula (5).

$$L' = LowR + \frac{L}{L + Factor} \times (HighR - LowR) \quad \text{formula 5}$$

In an embodiment of the present invention, a look-up table is calculated based on the reduced image in order to increase the calculating speed. However, a reduced image is obtained by downsampling or quantizing a large (high-resolution) input image. Therefore, the darkest pixel and the brightest pixel in the reduced image may not necessarily correspond to those in the large (high-resolution) image. In an embodiment of the present invention, the mapping space is located at values that are not included in the dynamic rage (Min_Y, Max_Y) of the reduced image, so that the look-up table can take into consideration the values of all pixels in the large (high-resolution) image.

Figure 5:
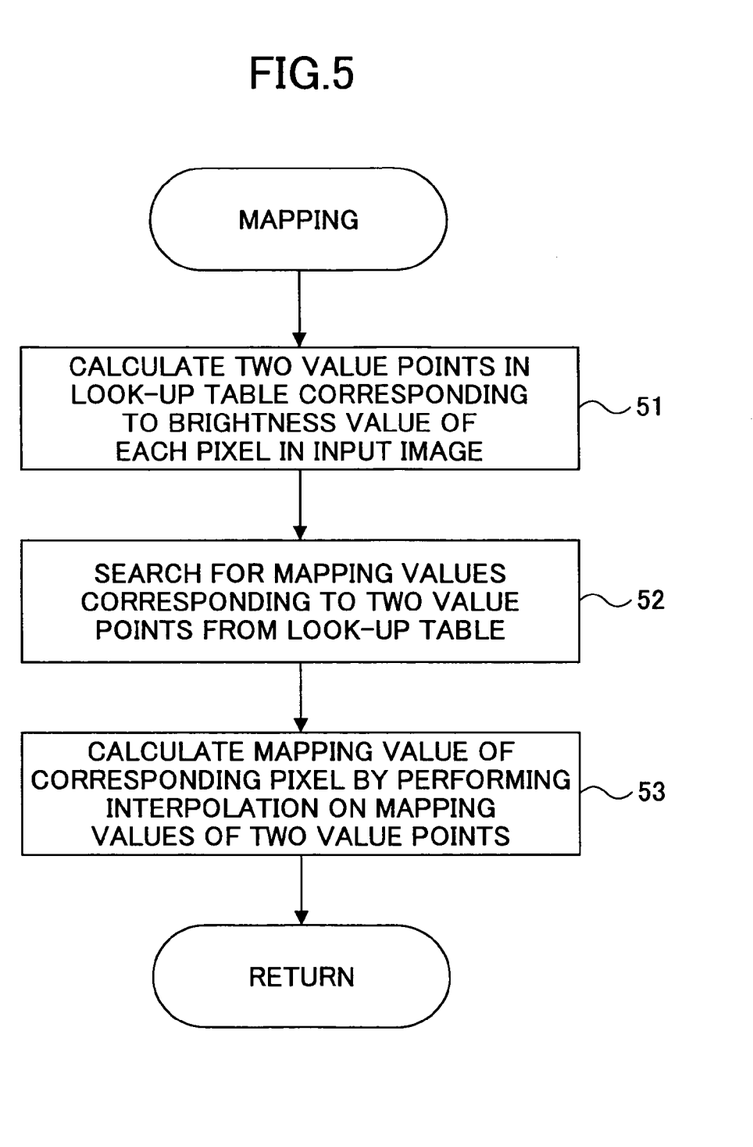
FIG. 5 is a structural flowchart of a mapping module according to an embodiment of the present invention.

FIG. 5 is a structural flowchart of the mapping module 13. The mapping module 13 performs calculations for each of the pixels in the input image. First, a module 51 quantizes a value L for the respective channels (R,Gr,Gb,B) of each pixel from 18 bits to 8 bits, to obtain a first point P1=L>>10 in a corresponding look-up table. The second point associated to the first point in the look-up table is P2=P1+1. Next, a module 52 searches for mapping values L'1 and L'2 corresponding to P1 and P2, respectively, from the look-up table. Finally, with respect to L'1 and L'2, a module 53 calculates a mapping value L' corresponding to L, by linear interpolation.

In an embodiment of the present invention, to save calculating time and memory space, mapping is performed by using the same look-up table for different image channels.

Figure 6:
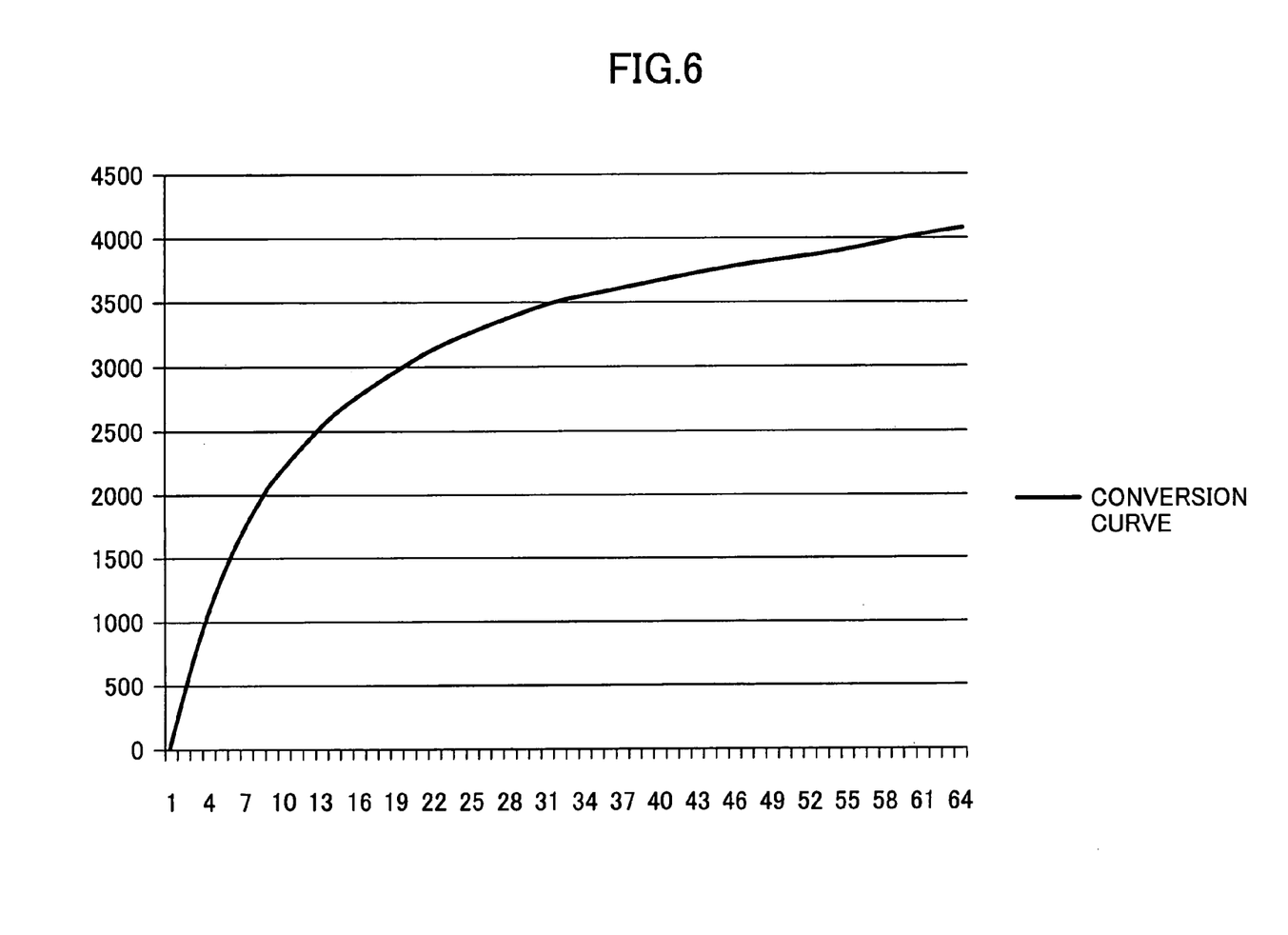
FIG. 6 illustrates a mapping conversion curve according to an embodiment of the present invention.

FIG. 6 illustrates a mapping conversion curve.

Figure 7:
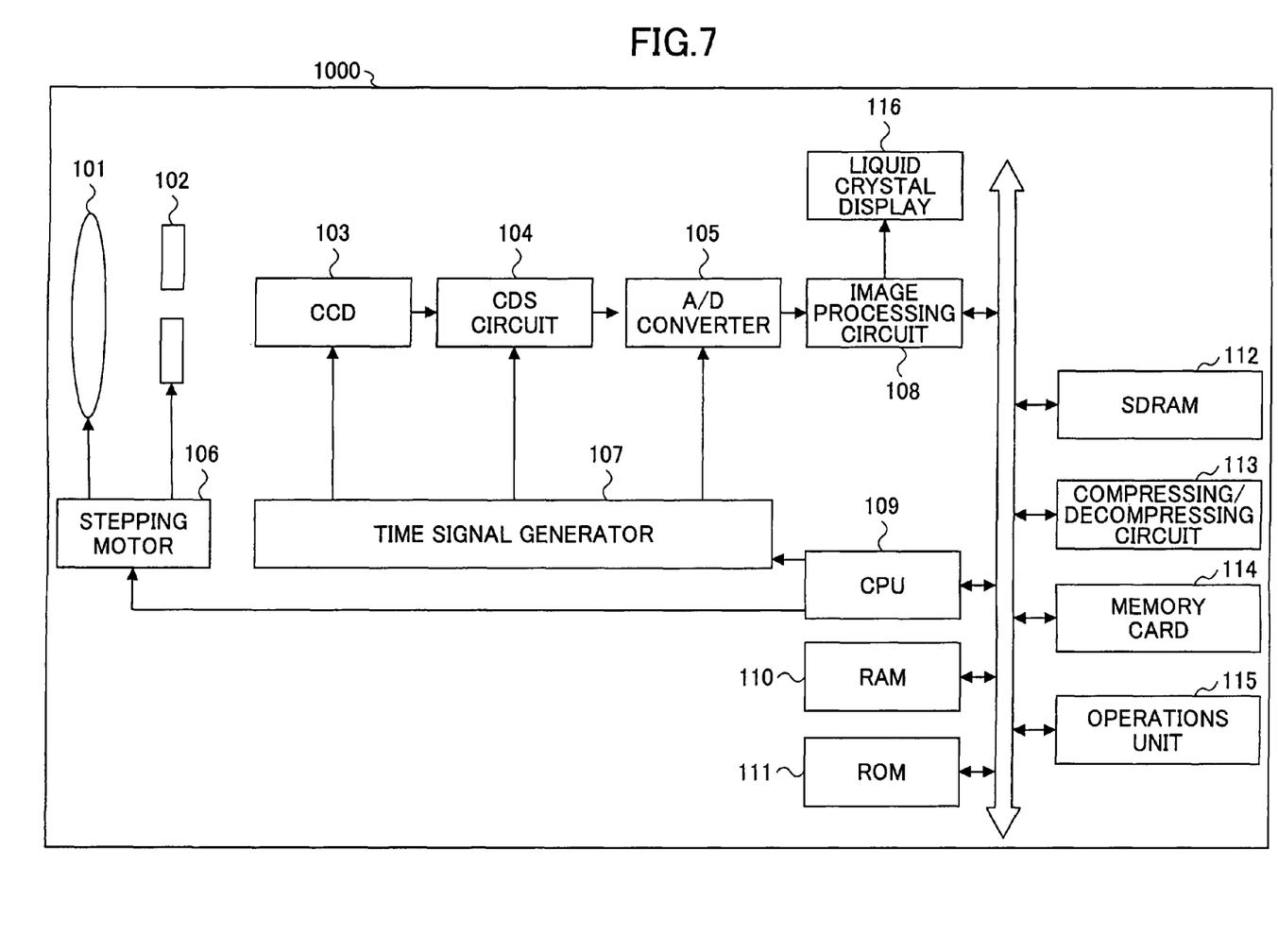
FIG. 7 illustrates a hardware configuration of an apparatus for compressing a dynamic range according to an embodiment of the present invention.

FIG. 7 illustrates a hardware configuration of a digital camera 1000. The digital camera is an example of a dynamic range compression apparatus according to an embodiment of the present invention. First, a light beam of a subject is radiated onto a charge-coupled device (CCD) 103 through an optical system 101. A mechanical shutter 102 is provided between the optical system 101 and the CCD 103, to prevent a light beam from outside to be radiated onto the CCD 103. The optical system 101 and the mechanical shutter 102 are driven by a stepping motor 106.

The CCD 103 converts the optical image obtained in an image pick-up region into electric signals, and outputs the electric signals as analog image signals. The image signals obtained by the CCD 103 are sent to a correlated double sampling (CDS) circuit 104, to undergo a noise-cancelling process. Subsequently, the image signals are converted into digital signals by an A/D converter 105, and are finally output to an image processing circuit 108.

The image processing circuit 108 temporarily stores the digital image signals in an SDRAM 112, to perform various image processing operations. For example, the digital image signals are used for performing YCrCb conversion (Y is brightness, CrCb indicates the color difference of Red and Blue), a white balance operation, contrast correction, edge accentuation, and color conversion. The white balance operation is performed for adjusting the density of the color of the image. The image signals that have undergone the image processing operation are output to and displayed on a liquid crystal display 116.

The image data is compressed/decompressed by a compressing/decompressing circuit 113, and is then saved in a memory card 114. According to a command from an operations unit 115, the compressing/decompressing circuit 113 performs a compressing operation (the image data is sent from the image processing circuit 108 to the memory card 114) or a decompressing operation (the image data is sent from the memory card 114 to the image processing circuit 108).

The digital camera 1000 includes a CPU 109 for performing various calculations based on a computer program. The CPU 109 provides time account signals to the CCD 103, the CDS circuit 104, and the A/D converter 105, with the use of a time signal generator 107. Furthermore, the CPU 109 controls the image processing circuit 108, the compressing/decompressing circuit 113, and the memory card 114.

Furthermore, the digital camera 1000 includes a read only memory (ROM) 111 and a random access memory (RAM) 110. The ROM 111 and the RAM 110 are connected by a bus. The ROM 111 is used for saving computer programs, and the RAM 110 provides work areas for various process operations and data saving areas.

When a tone mapping operation is performed in the digital camera 1000, the system first loads the tone mapping program (including a microimage calculation module, a look-up table calculation module, and a mapping module) from the ROM 111 into the RAM 110, and then executes the program. The tone mapping program first acquires the image data temporarily saved in the SDRAM 112, and causes the reduced image calculation module 11, the look-up table calculation module 12, and the mapping module 13 to perform calculations. As a result, an image applicable to the dynamic range of the medium (liquid crystal display 116) is generated, and this image is finally saved in the SDRAM 112.

The above-described embodiment of the present invention has the following effects.

According to an embodiment of the present invention, the look-up table is calculated based on the reduced image, instead of on the original input image. Therefore, the overall tone mapping process can be accelerated, and the problem of the low processing capacity of the digital camera in processing large (high-resolution) images can be solved.

According to an embodiment of the present invention, the look-up table is calculated based on the reduced image, and the mapping space is located at values that are not included in the dynamic range (Min_Y, Max_Y) of the reduced image, so that the look-up table can take into consideration the values of all pixels in the large (high-resolution) image (original image).

The present invention is not limited to the specifically disclosed embodiment, and variations and modifications may be made without departing from the scope of the present invention.

The present application is based on Chinese Priority Patent Application No. 2008-10100720, filed on May 20, 2008, the entire contents of which are hereby incorporated herein by reference.

What is claimed is:

1. A method of compressing an original dynamic range of an original image, comprising:

a first step of obtaining, by a processor, a reduced image corresponding to the original image by performing quantization and downsampling on the original image that has been input;

a second step of calculating, by a processor, a look-up table based on the reduced image, wherein the look-up table indicates a mapping relationship between the original dynamic range of the original image and a dynamic range of a medium; and a third step of mapping, by a processor, each of the pixels in the original image from the original dynamic range of the original image onto the dynamic range of the medium based on the look-up table.

2. The method according to claim 1, wherein the first step comprises:

a step a1 of performing the downsampling by reducing a size of the original image to obtain a reduced-size image;

a step a2 of performing the quantization by reducing a number of bits per channel of each of the pixels in the reduced-size image to obtain the reduced image; and a step a3 of calculating a brightness value of each of the pixels in the reduced image based on corresponding R, G, B values in the reduced image.

3. The method according to claim 1, wherein the second step comprises:

a step b1 of calculating a minimum brightness value, a maximum brightness value, and an average brightness value of each of the pixels in the reduced image;

a step b2 of calculating a first parameter Factor, a second parameter LowR, and a third parameter HighR with the use of a predetermined empirical formula, based on the minimum brightness value, the maximum brightness value, and the average brightness value; and a step b3 of generating the look-up table by acquiring the mapping relationship based on the first parameter Factor, the second parameter LowR, and the third parameter HighR.

4. The method according to claim 3, wherein the mapping relationship at step b3 is acquired by:

linearly mapping a value from a range between zero and the minimum brightness value in the original dynamic range to a range between zero and the second parameter LowR in the dynamic range of the medium;

linearly mapping a value from a range between the maximum brightness value in the original dynamic range and a maximum logical value of the original image to a range between the third parameter HighR in the dynamic range of the medium and a medium maximum value in the dynamic range of the medium; and mapping a value from a range between the minimum brightness value and the maximum brightness value in the original dynamic range to a range between the second parameter LowR and the third parameter HighR in the dynamic range of the medium.

5. The method according to claim 4, wherein the value from the range between the minimum brightness value and the maximum brightness value in the original dynamic range is mapped to the range between the second parameter LowR and the third parameter HighR in the dynamic range of the medium, with the use of the following formula:

$$L' = LowR + \frac{L}{L + Factor} \times (HighR - LowR)$$

where L is the value between the maximum brightness value and the minimum brightness value in the original dynamic range, and L' is a mapping value in the dynamic range of the medium, which is mapped from the original dynamic range.

6. The method according to claim 1, wherein the third step comprises:

a step c1 of selecting a current pixel from the original image, and acquiring two value points that are nearest to a value of a channel of the current pixel, from the original dynamic range defined in the look-up table;

a step c2 of acquiring two mapping values corresponding to the two value points, from the dynamic range of the medium defined in the look-up table, based on the mapping relationship;

a step c3 of acquiring a final mapping value in the dynamic range of the medium by performing linear interpolation between the two mapping values, the final mapping value being a value to which the value of the channel of the current pixel is mapped; and a step c4 of performing the steps c1 through c3 for values of each channel of each of the pixels in the original image.

7. The method according to claim 3, wherein the predetermined empirical formula includes the following formulas:

$$LowR = \frac{Min\_Y}{10} \times \frac{Medium\_Range}{100}$$

$$HighR = \left(255 - \frac{(255 - Max\_Y)}{10}\right) \times \frac{Medium\_Range}{100}$$

$$Factor = Average\_Y \times \frac{10}{10 + f} + 30$$

where Medium_Range is the dynamic range of the medium, Min_Y is the minimum brightness value, Max_Y is the maximum brightness value, Average_Y is the average brightness value, and f is a parameter for controlling overall brightness of an output image.

8. The method according to claim 6, wherein:

the values of the channels of different colors of each of the pixels are mapped with the use of the same look-up table.

9. An apparatus, including a processor, for compressing an original dynamic range of an original image, comprising:

a reduced image calculation module configured to obtain a reduced image corresponding to the original image by performing quantization and downsampling on the original image that has been input, using a processor;

a look-up table calculation module configured to calculate a look-up table based on the reduced image, using a processor, wherein the look-up table indicates a mapping relationship between the original dynamic range of the original image and a dynamic range of a medium; and a mapping module configured to map each of the pixels in the original image from the original dynamic range of the original image onto the dynamic range of the medium based on the look-up table, using a processor.

10. The apparatus according to claim 9, wherein the reduced image calculation module comprises:

a downsampling module configured to perform the downsampling by reducing a size of the original image to obtain a reduced-size image;

a quantization module configured to perform the quantization by reducing a number of bits per channel of each of the pixels in the reduced-size image to obtain the reduced image; and a brightness calculation module configured to calculate a brightness value of each of the pixels in the reduced image based on corresponding R, G, B values in the reduced image.

11. The apparatus according to claim 9, wherein the look-up table calculation module comprises:
a statistical feature calculation module configured to calculate a minimum brightness value, a maximum brightness value, and an average brightness value of each of the pixels in the reduced image;
a parameter calculation module configured to calculate a first parameter Factor, a second parameter LowR, and a third parameter HighR with the use of a predetermined empirical formula, based on the minimum brightness value, the maximum brightness value, and the average brightness value; and
a look-up table generation module configured to generate the look-up table by acquiring the mapping relationship based on the first parameter Factor, the second parameter LowR, and the third parameter HighR.

12. A digital camera for compressing an original dynamic range of an original image, comprising a CPU, a ROM, and a RAM, where a function unit of the ROM comprises:
a reduced image calculation module configured to obtain a reduced image corresponding to the original image by performing quantization and downsampling on the original image that has been input;
a look-up table calculation module configured to calculate a look-up table based on the reduced image, wherein the look-up table indicates a mapping relationship between the original dynamic range of the original image and a dynamic range of a medium; and
a mapping module configured to map each of the pixels in the original image from the original dynamic range of the original image onto the dynamic range of the medium based on the look-up table.

13. The digital camera according to claim 12, wherein:
the function unit is loaded in the RAM and executed by the CPU.

* * * * *